United States Patent
Suzuki

(10) Patent No.: US 7,482,938 B2
(45) Date of Patent: Jan. 27, 2009

(54) VEHICLE-OCCUPANT'S STATUS DETECTING DEVICE

(75) Inventor: Takeyuki Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 11/367,545

(22) Filed: Mar. 6, 2006

(65) Prior Publication Data

US 2006/0219459 A1  Oct. 5, 2006

(30) Foreign Application Priority Data

Mar. 29, 2005  (JP)  ............................. 2005-095505

(51) Int. Cl.
*G08B 23/00* (2006.01)

(52) U.S. Cl. ................. 340/576; 340/573.1; 340/425.5; 340/575

(58) Field of Classification Search ................. 340/576, 340/575, 539.12, 539.15, 573.1
See application file for complete search history.

(56) References Cited

U.S. PATENT DOCUMENTS

| 5,404,128 | A | * | 4/1995 | Ogino et al. ............. 340/425.5 |
| 5,521,580 | A | * | 5/1996 | Kaneko et al. .............. 340/439 |
| 5,853,005 | A | * | 12/1998 | Scanlon ....................... 600/459 |
| 6,104,296 | A | * | 8/2000 | Yasushi et al. .............. 340/576 |
| 6,271,760 | B1 | * | 8/2001 | Watanabe et al. ........... 340/667 |
| 6,313,749 | B1 | * | 11/2001 | Horne et al. ................. 340/575 |
| 6,696,943 | B1 | * | 2/2004 | Elrod et al. .............. 340/539.1 |
| 7,015,818 | B2 | * | 3/2006 | Takashima .................. 340/576 |
| 7,088,250 | B2 | * | 8/2006 | Yasushi .................... 340/573.1 |
| 7,183,930 | B2 | * | 2/2007 | Basir et al. ............... 340/573.1 |
| 7,219,923 | B2 | * | 5/2007 | Fujita et al. ................. 280/735 |
| 2004/0201481 | A1 | * | 10/2004 | Yoshinori et al. ........... 340/575 |

FOREIGN PATENT DOCUMENTS

JP    2000-099867    4/2000

* cited by examiner

*Primary Examiner*—George A Bugg
*Assistant Examiner*—Hoi C Lau
(74) *Attorney, Agent, or Firm*—Arent Fox LLP

(57) ABSTRACT

A vehicle-occupant's status detecting device is provided in a vehicle and includes a running-supporting device for supporting driving operations of a vehicle-occupant in the vehicle while the vehicle is moving. The vehicle-occupant's status detecting device includes a biological data detecting device having a vibration-detecting sensor which detects biological data of the vehicle-occupant; and a detection-permitting device which permits, only when the running-supporting device is in operation while the vehicle is moving, the biological data detecting device to detect the biological data.

6 Claims, 5 Drawing Sheets

VEHICLE-OCCUPANT'S STATUS DETECTING DEVICE

BACKGROUND OF THE INVENTION

Priority is claimed on Japanese Patent Application No. 2005-095505, filed Mar. 29, 2005, the contents of which are incorporated herein-by reference.

FIELD OF THE INVENTION

The present invention relates to a vehicle-occupant's status detecting device for detecting a status of a body of an occupant in a moving car.

DESCRIPTION OF THE RELATED ART

As for this kind of device, a conventional vehicle-occupant's status detecting device having a vibration-detecting sensor for detecting micro-vibrations, on a seat on which a vehicle-occupant is seated, and detecting the pulse, blood pressure, or the like of the vehicle-occupant through the vibration-detecting sensor (for example, refer to Japanese Unexamined Patent Application, First Publication No. 2000-99867), is proposed. In more detail, the pulse is estimated by counting the changes in the micro-vibrations due to the flow of the blood stream of the vehicle-occupant seating seated in the seat, while the blood pressure is estimated by the amplitude of the micro-vibrations due to the blood stream of the vehicle-occupant.

This conventional vehicle-occupant's status detecting device detects the micro-vibrations of the blood stream or the like using the vibration-detecting sensor, and estimates the pulse and the blood pressure based on vibration data; therefore, the vibration-detecting sensor needs to have high sensitivity. However, increasing the sensitivity of the vibration-detecting sensor means that the vibration-detecting sensor will also detect fluctuations or the like of a seat due to driving operations of the vehicle-occupant, in addition to vibration data of a body such as the blood stream or the like; therefore, the conventional vehicle-occupant's status detecting device had difficulties in collecting accurate biological data.

The present invention was made in view of the above circumstances, and has an object of providing a vehicle-occupant's status detecting device which enables improvements in detecting the accuracy of biological data by, as far as possible, avoiding the vibration-detecting sensor from detecting vibrations other than biological data.

SUMMARY OF THE INVENTION

In order to achieve the above-mentioned object, the present invention adopts a vehicle-occupant's status detecting device provided in a vehicle having a running-supporting device for supporting driving operations of a vehicle-occupant in the vehicle on moving, the vehicle-occupant's status detecting device including: a biological data detecting device having a vibration-detecting sensor which detects biological data of the vehicle-occupant; and a detection-permitting device which permits, only when the running-supporting device is in operation, the biological data detecting device to detect the biological data.

According to the vehicle-occupant's status detecting device, when the running-supporting device is in operation and thereby in a state where frequent operations of the driver are not required, the permitting device permits the biological data detecting device to detect the biological data. Thereafter, detections of the biological data are performed.

Accordingly, detections of the biological data are performed when the running-supporting device is in operation and thereby in a state where frequent operations of the driver are not required; therefore, the vibration-detecting sensor has less possibility of erroneously detecting fluctuations or the like of the seat due to driving operations of the vehicle-occupant. As a result, accuracy in detecting the biological data reliably increases.

The detection-permitting device may permit the biological data detecting device to detect the biological data after a predetermined time from a beginning of an operation of the running-supporting device.

In this case, a detection of the biological data will be permitted not immediately after a starting operation of the running support device, but after the predetermined time has passed where operations by the vehicle-occupant become stable.

Accordingly, since the detection of the biological data is performed after the predetermined time from the beginning of the operation of the running-supporting device, it becomes possible to perform detections with high precision in a condition where operations by the vehicle-occupant become stable and thereby vibrations or the like of the seat hardly occur.

The biological data detecting device may detect the biological data for every predetermined time.

In this case, after the time when the operation of the running-supporting device is activated and the biological data is once detected, detections of the biological data are performed periodically while the running-supporting device is in operation.

Accordingly, since the biological data is periodically detected while the running-supporting device is in operation, it becomes possible to periodically check for exhaustion, indications of catnapping, or the like of the vehicle-occupant while the vehicle is moving.

The vehicle-occupant's status detecting device may further include a noise-cancelling device which cancels a noise by generating a spatial vibration in opposition to noises inside of the vehicle and outside of the vehicle.

In this case, since the noise-cancelling device generates the spatial vibration in opposition to the noises, vibrations resulting from the noises are cancelled and are therefore not detected by the vibration-detecting sensor.

Accordingly, since the noises inside the vehicle and outside the vehicle can actively be cancelled by the noise-cancelling device, it becomes possible to further increase the accuracy in detecting the biological data.

The vehicle-occupant's status detecting device may further include a noise-cancelling device which cancels a noise signal by generating a signal corresponding to a spatial vibration in opposition to noises inside of the vehicle and outside of the vehicle.

In this case, since the noise-cancelling device generates the signal corresponding to opposition of the spatial vibration, a noise component within the noise signal and the biological data once detected by the vibration-detecting sensor can be cancelled.

Accordingly, since the noises inside the vehicle and outside the vehicle can actively be cancelled by the noise-cancelling device, it becomes possible to further increase the accuracy in detecting the biological data.

DETAILED DESCRIPTION OF THE INVENTION

One embodiment of the present invention will be explained in the following with reference to FIGS. 1 and 2.

Figure 1:
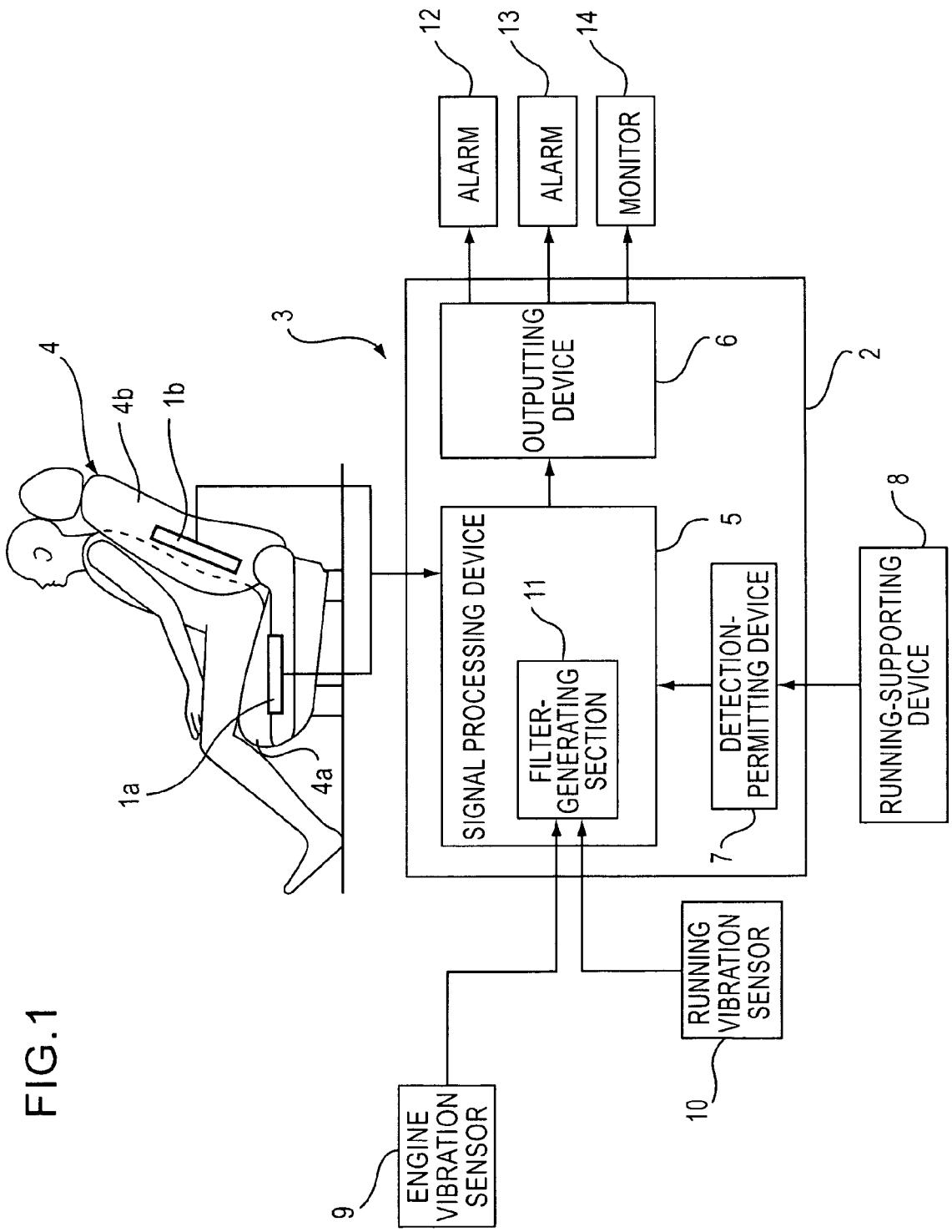
FIG. 1 shows a general arrangement of a device of one embodiment of the present invention.
Figure 2:
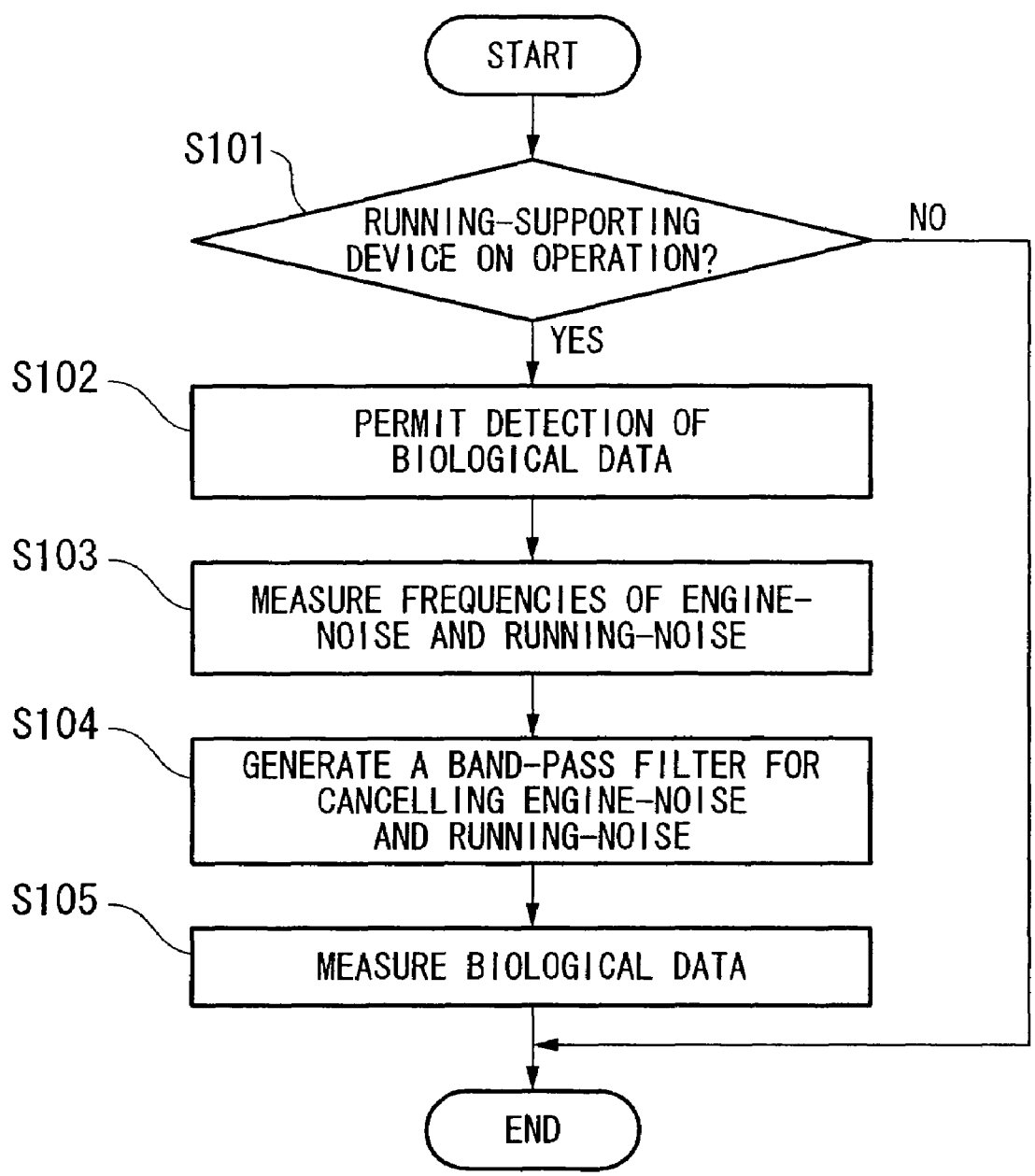
FIG. 2 shows a flowchart showing control processes in the same embodiment.

FIG. 1 shows a general arrangement of a vehicle-occupant's status detecting device. The vehicle-occupant's status detecting device is provided with a sensor unit (a biological data detecting device) 3 having, as main components, vibration-detecting sensors 1a and 1b each capable of detecting micro-vibrations, and a sensor controller 2. The vibration-detecting sensor 1a is installed inside a seat cushion 4a, while the vibration-detecting sensor 1b is installed inside a backrest 4b; thereby, detecting the biological data such as pulse (i.e., heartbeats), blood pressure, breathing rate, and the like of a vehicle-occupant. The vibration-detecting sensors 1a and 1b are formed by pressure-sensing elements such as a piezo element, a piezoelectric element, or the like.

In the following, a detecting method for detecting biological data by the sensor unit 3 will be briefly explained. For example, the pulse is estimated by counting peak values of changes in micro-vibrations due to flow of the blood stream of the vehicle-occupant seated in a seat 4, or the like, while the blood pressure is estimated by the amplitude of the micro-vibrations of the blood stream of the vehicle-occupant seated in the seat 4. Breathing is estimated by measuring the period of repetitions between expansion and contraction of the lungs of the vehicle-occupant contacting closely to the backrest 4b. The changes in blood stream and breathing will slightly fluctuate the seat 4 through a portion contacting closely with the vehicle-occupant; and thereby the changes in the pressure are detected by the vibration-detecting sensors 1a and 1b.

Moreover, in the present embodiment, each of the seat cushion 4a and the backrest 4b are provided with one of the vibration-detecting sensors 1a and 1b; however, the vibration-detecting sensors 1a and 1b may be provided to only one of the seat cushion 4a and the backrest 4b. However, by providing to both of the seat cushion 4a and the backrest 4b, erroneous detections will hardly occur, and thereby enabling increased detection accuracy.

The sensor controller 2 is provided with: a signal processing device 5 for processing signals input from the vibration-detecting sensors 1a and 1b through a band pass filter and the like; an outputting device 6 for outputting the signal processed by the signal processing device 5 to the outside; and a detection-permitting device 7 for permitting the sensor unit 3 to detect the biological data only when an ON signal is input from the outside.

The detection-permitting device 7 is connected to an operation switch of a running-supporting device 8 provided on the vehicle; thereby, receiving the ON signal from the running-supporting device 8 when the running-supporting device 8 is activated. Here, the running-supporting device 8 is a device for decreasing operations of the driver while the vehicle is running, such as an auto-cruise control device, an inter-vehicle distance control device, a lane-tracking device, or the like.

In the vehicle-occupant's status detecting device, a condition for permitting the detection of the biological data is to confirm that the running-supporting device 8 is activated and to confirm that frequent driving operations (i.e., a pedal operation, a steering wheel operation, a shifting operation, and the like) are decreased.

In addition, the vehicle is provided with: an engine-vibration sensor 9 for detecting vibrations of an engine; and a running-vibration sensor 10 for detecting vibrations during the running of the vehicle. Each of the engine-vibration sensor 9 and the running-vibration sensor 10 is connected to the signal processing device 5 of the sensor controller 2. Detection signals from the engine-vibration sensor 9 and the running-vibration sensor 10 are input into a filter-generating section 11 of the signal processing device 5; and the filter-generating section 11 generates band-pass filters each corresponding to frequencies of noises detected by the engine-vibration sensor 9 and the running-vibration sensor 10. Therefore, in the signal processing device 5, noise components corresponding to the engine-vibration and the running-vibration will be cut by the band-pass filters generated therein. Moreover, frequencies of the pulse and the breathing of the driver are within a frequency range of 0 to 10 Hz.

In addition, alarm devices 12 and 13 for setting of an alarm using sounds, vibrations, or the like when a signal indicating some abnormalities of the driver such as exhaustion or drowsiness is detected, and a monitor 14 for displaying the detected results, are connected to the outputting device 6 of the sensor controller 2.

Hereinafter, controlling processes of the vehicle-occupant's status detecting device will be explained with reference to a flowchart of FIG. 2.

Firstly, in step S101, it is judged whether the running-supporting device 8 is in operation. At this time, if the running-supporting device 8 is not in operation, then the process proceeds to END without detecting the biological data. On the other hand, if the running-supporting device 8 is in operation, then the process proceeds to step S102 and a detection of the biological data is permitted. Subsequently, in step S103, the engine-noise and the running-noise are measured, and in step S104, band-pass filters for cutting the engine-noise and the running-noise are generated. Subsequently, the signal processing device 5 which sets the band-pass filters will measure the biological data.

As explained in the above, in the vehicle-occupant's status detecting device, detections of the biological data are permitted only when the running-supporting device 8 is in operation and thereby in a state where frequent operations of the driver are not required; therefore, the possibility of erroneously detecting fluctuations or the like of the seat due to driving operations can be small.

In addition, in the vehicle-occupant's status detecting device, the signal processing device 5 sets the band-pass filters so as to cut noise components within the detected engine-vibrations and running-vibrations; therefore, erroneous detections due to the engine-vibrations and the running-vibrations can be prevented.

Furthermore, in the vehicle-occupant's status detecting device, the biological data is periodically detected while the running-supporting device 8 is in operation. Therefore, it becomes possible to monitor the driver's status while the running-supporting device 8 is in operation, to reliably detect the exhaustion or the drowsiness of the driver, and to warn it to the driver in an early stage through the alarm devices 12 and 13, or the like.

Figure 3:
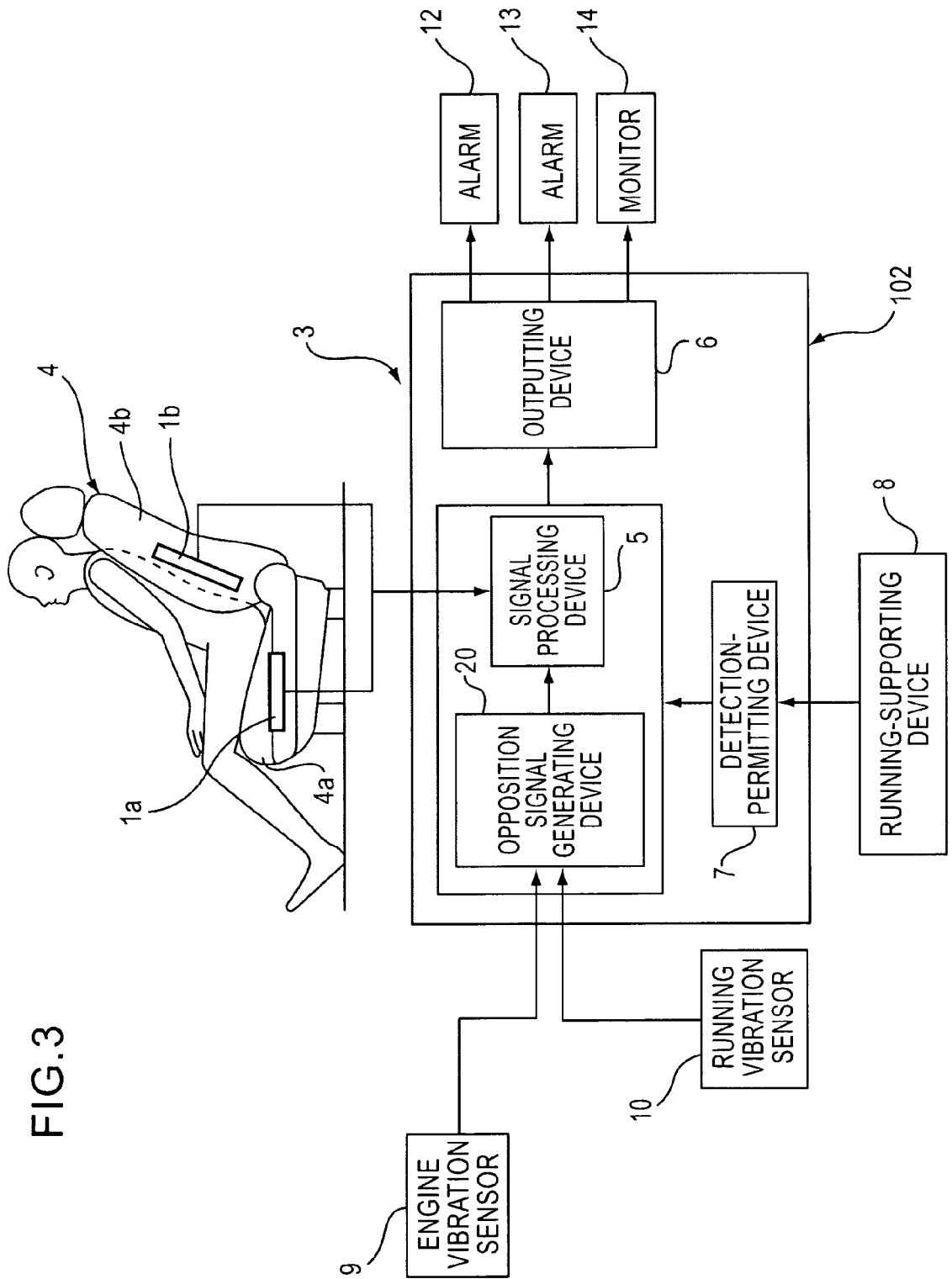
FIG. 3 shows a general arrangement of a device of another embodiment of the present invention.

Hereinafter, another embodiment of the present invention will be explained with reference to FIGS. 3 and 4. The present embodiment differs from the above-mentioned embodiment only in the point that a sensor controller 102 of the sensor unit 3 has a different configuration; and other configurations thereof are the same as the above-mentioned embodiment.

A vehicle-occupant's status detecting device of the present embodiment is provided with a sensor controller 102 having an opposition signal generating device (a noise-cancelling device) 20 for generating signals corresponding to an opposition of vibrations of the engine-noise and an opposition of vibrations of the running-noise. The signals generated by the opposition-signal generating device 20 are merged with the detected signals from the vibration-detecting sensors 1a and 1b; thereby preventing erroneous detections due to the engine-noise and the running-noise.

Figure 4:
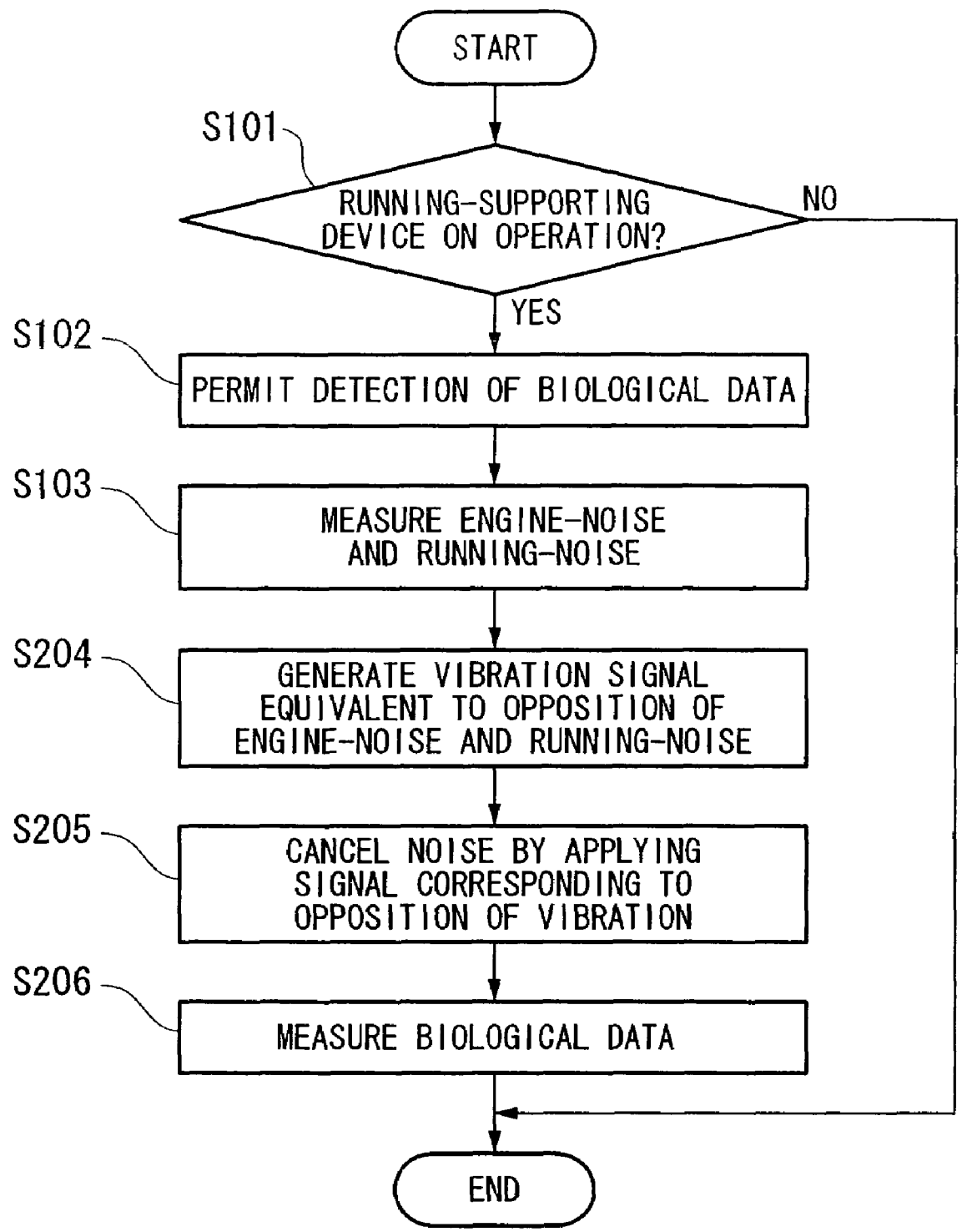
FIG. 4 shows a flowchart showing control processes in the same embodiment.

In a flowchart shown in FIG. 4, only processes after step S204 are different from those of the above-mentioned embodiment. In step S204, signals corresponding to opposition are generated; and in step S205, the detected signals and signals generated corresponding to opposition are merged with each other.

Figure 5:
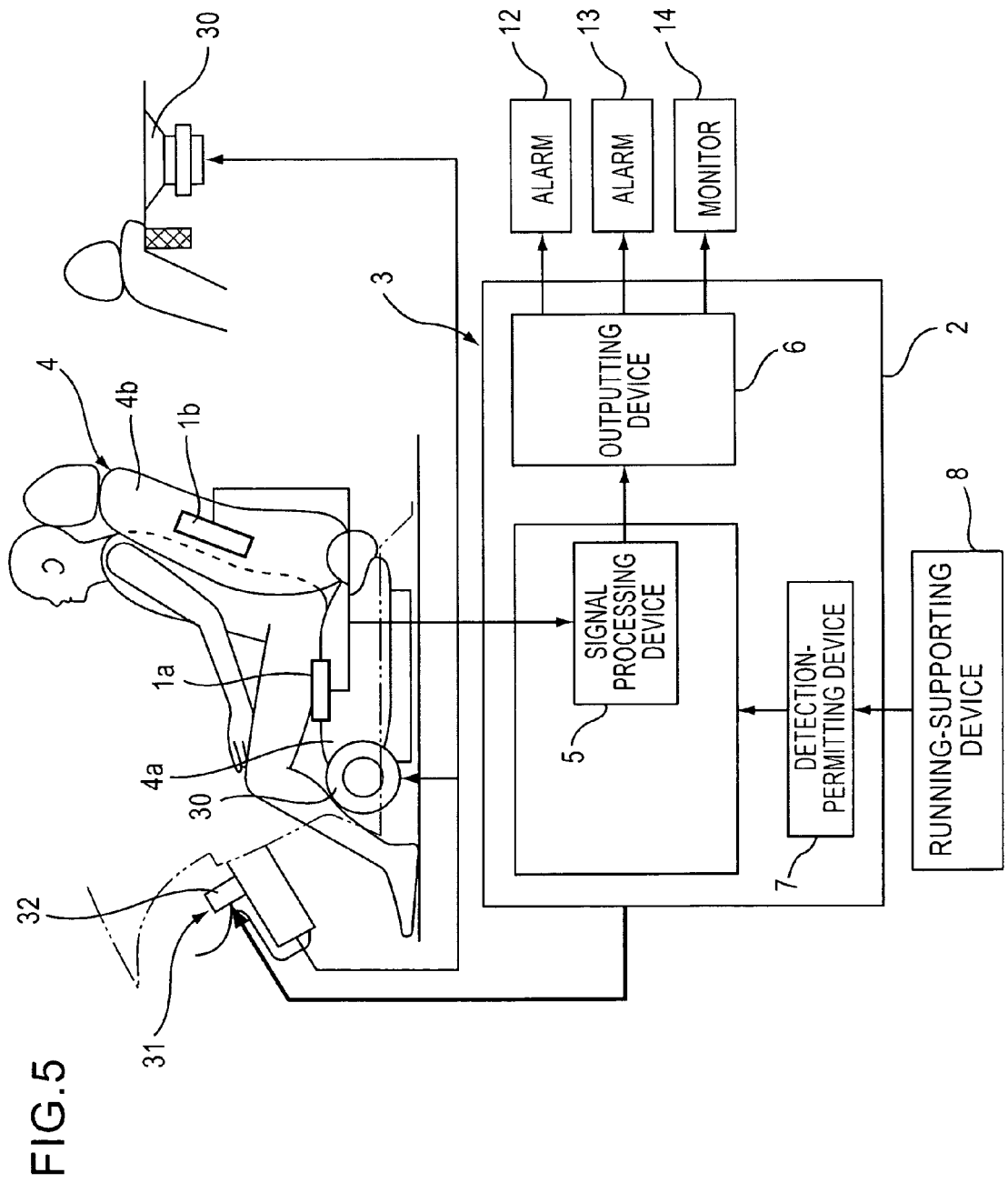
FIG. 5 shows a general arrangement of a device of another embodiment of the present invention.

FIG. 5 shows another embodiment of the present invention having an active-noise-controlling system 31 (hereinafter "ACC 31") which reduces noises by outputting vibrations in opposition to the engine-noise and the running-noise detected by a microphone 32, from a speaker 30 inside the vehicle. In the present embodiment, noises inside the vehicle are cut by operating the ACC 31 while detecting the biological data. The present embodiment is the same as other embodiments in the point that detection of the biological data is permitted only when the running-supporting device 8 is in operation. In the present embodiment, the ACC 31 forms a noise-cancelling device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, in each of the above-mentioned embodiments, detections of the biological data are permitted immediately after an activation of the running-supporting device 8; however, it may be arranged such that the detections of the biological data are permitted after a predetermined time from a beginning of an operation of the running-supporting device 8 by using and setting a timer or the like. In this case, it becomes possible to prevent an abnormality of erroneous detections of fluctuations of a seat due to switching operations or the like of the running-supporting device 8.

What is claimed is:

1. A vehicle-occupant's status detecting device provided in a vehicle having a running-supporting device for actively assisting driving operations of a vehicle-occupant in the vehicle while the vehicle is moving, the vehicle-occupant's status detecting device comprising:
   a biological data detecting device having a vibration-detecting sensor which detects biological data of the vehicle-occupant; and
   a detection-permitting device which permits the biological data detecting device to detect the biological data of the vehicle occupant, only the running-supporting device is activated and in operation while the vehicle is moving, and detection of a decrease of at least one of a pedal operation, a steering operation, and a shifting operation while the vehicle is moving; and an output device which displays results detected by the biological data detecting device or issues an alarm when an abnormality is detected in the results detected by the biological data detecting device.

2. The vehicle-occupant's status detecting device according to claim 1, wherein the detection-permitting device permits the biological data detecting device to detect the biological data after a predetermined time from a beginning of an operation of the running-supporting device.

3. The vehicle-occupant's status detecting device according to claim 1, wherein the biological data detecting device detects the biological data for every predetermined time.

4. The vehicle-occupant's status detecting device according to claim 1, further comprising
   a noise-cancelling device which cancels a noise by generating a spatial vibration in opposition to noises inside of the vehicle and outside of the vehicle.

5. The vehicle-occupant's status detecting device according to claim 1, further comprising
   a noise-cancelling device which cancels a noise signal by generating a signal corresponding to a spatial vibration in opposition to noises inside of the vehicle and outside of the vehicle.

6. The vehicle-occupant's status detecting device according to claim 1, wherein the running-supporting device is at least one of a cruise control device, an inter-vehicle distance control device, and a lane-tracking device.

* * * * *